(12) United States Patent
Bengio et al.

(10) Patent No.: US 10,140,980 B2
(45) Date of Patent: Nov. 27, 2018

(54) COMPLEX LINEAR PROJECTION FOR ACOUSTIC MODELING

(71) Applicant: Google LLC, Mountain View, CA (US)

(72) Inventors: Samuel Bengio, Los Altos, CA (US); Mirko Visontai, Mountain View, CA (US); Christopher Walter George Thornton, Mountain View, CA (US); Michiel A. U. Bacchiani, Summit, NJ (US); Tara N. Sainath, Jersey City, NJ (US); Ehsan Variani, Mountain View, CA (US); Izhak Shafran, Menlo Park, CA (US)

(73) Assignee: Google LCC, Mountain View, CA (US)

( * ) Notice: Subject to any disclaimer, the term of this patent is extended or adjusted under 35 U.S.C. 154(b) by 0 days.

(21) Appl. No.: 15/386,979

(22) Filed: Dec. 21, 2016

(65) Prior Publication Data

US 2018/0174575 A1 Jun. 21, 2018

(51) Int. Cl.
*G10L 15/16* (2006.01)
*G10L 19/02* (2013.01)
*G10L 15/02* (2006.01)

(52) U.S. Cl.
CPC .............. *G10L 15/16* (2013.01); *G10L 15/02* (2013.01); *G10L 19/0212* (2013.01)

(58) Field of Classification Search
CPC ....................................................... G10L 15/16
See application file for complete search history.

(56) References Cited

U.S. PATENT DOCUMENTS

| | | | |
|---|---|---|---|
| 4,802,225 A | 1/1989 | Patterson | |
| 5,805,771 A | 9/1998 | Muthusamy et al. | |
| 7,072,832 B1 | 7/2006 | Su et al. | |
| 9,697,826 B2 | 7/2017 | Sainath | |
| 2013/0166279 A1* | 6/2013 | Dines ...................... | G10L 15/02 704/8 |
| 2014/0288928 A1* | 9/2014 | Penn ....................... | G10L 15/16 704/232 |
| 2015/0058004 A1 | 2/2015 | Dimitriadis et al. | |

(Continued)

OTHER PUBLICATIONS

Sainath. "Towards End-to-End Speech Recognition Using Deep Neural Networks," PowerPoint presentation, Deep Learning Workshop, ICML, Jul. 10, 2015, 51 pages.

(Continued)

*Primary Examiner* — Douglas Godbold
(74) *Attorney, Agent, or Firm* — Fish & Richardson P.C.

(57) ABSTRACT

Methods, systems, and apparatus, including computer programs encoded on a computer storage medium, for speech recognition using complex linear projection are disclosed. In one aspect, a method includes the actions of receiving audio data corresponding to an utterance. The method further includes generating frequency domain data using the audio data. The method further includes processing the frequency domain data using complex linear projection. The method further includes providing the processed frequency domain data to a neural network trained as an acoustic model. The method further includes generating a transcription for the utterance that is determined based at least on output that the neural network provides in response to receiving the processed frequency domain data.

20 Claims, 6 Drawing Sheets

(56) References Cited

U.S. PATENT DOCUMENTS

| | | | |
|---|---|---|---|
| 2015/0293745 A1 | 10/2015 | Suzuki | |
| 2016/0322055 A1 | 11/2016 | Sainath | |
| 2017/0148433 A1* | 5/2017 | Catanzaro | G10L 15/02 |
| 2017/0162194 A1* | 6/2017 | Nesta | G10L 15/20 |

OTHER PUBLICATIONS

Feng et al. "Geometric ℓp-norm feature pooling for image classification." IEEE Conference on Computer Vision and Pattern Recognition, 2011, 8 pages.

Aestern et al. "Spectro-temporal receptive fields of auditory neurons in the grassfrog," Biological Cybermetrics, 1980, 235-248.

Anonymous. "Complex Linear Projection: An Alternative to Convolutional Neural Network," 10 pages, Dec. 2015.

Bell et al. "An information-maximization approach to blind separation and blind deconvolution," Neural Computation, 1995, 7.6: 38 pages.

Bell et al. "Learning the higher-order structure of a natural sound," Network: Computation in Neural Systems, 1996, 7.2: 8 pages.

Bengio et al. "Scaling Learning Algorithms Towards AI," Large Scale Kernel Machines, 2007, 41 pages.

Biem et al. "A discriminative filter bank model for speech recognition," Eurospeech, 1995, 4 pages.

Burget et al. "Data driven design of filter bank for speech recognition, " Text, Speech and Dialogue, 2001, 6 pages.

Davis et al. "Comparison of parametric representations for monosyllabic word recognition in continuously spoken sentences," IEEE transactions on Acoustics, Speech and Signal Processing, 1980, 28.4: 24 pages.

Dean et al. "Large Scale Distributed Deep Networks," in Proc. NIPS, 2012, 9 pages.

Dieleman et al. "End-to-end learning for music audio," In Acoustics, Speech and Signal Processing (ICASSP), 2014, 5 pages.

Feng et al. "Geometric l p-norm feature pooling for image classification." IEEE Conference on Computer Vision and Pattern Recognition, 2011, 8 pages.

Field. "Relations between the statistics of natural images and the response properties of cortical cells," JOSA A 4.12 (1987): 16 pages.

Field. "What is the Goal of sensory coding?," Neural computation, 1994, 6.4: 44 pages.

Golik et al. "Convolutional neural networks for acoustic modeling of raw time signal in lvcsr," Sixteen Annual Conference of the International Speech Communication Associates, 2015, 5 pages.

Heigold et al. "End-to-end text-dependent text dependent speaker verification," arXiv preprint arXiv, 2015, 1509.08062 5 pages.

Hinton et al. "Deep Neural Networks for Acoustic Modeling in Speech Recognition," IEEE Signal Processing Magazine, 2012, vol. 29, No. 6, 27 pages.

Hoshen et al. "Speech Acoustic Modeling from Raw Multichannel Waveforms, " Proc. ICASSP. IEEE, 2015, 5 pages.

Jaitly et al. "Learning a better representation of speech soundwaves using restricted boltzman machines," IEEE International Conference on Acoustics, Speech and Signal Processing, 2011, 4 pages.

Law et al. "Input-agreement: a new mechanism for collecting data using human computation games," In Proceedings of the SIGCHI Conference on Human Factors in Computing Systems, 2009, 10 pages.

Le Cun et al. "Handwritten digit recognition with a backpropagation network," Advances in neural information processing systems, 1990, 9 pages.

Lewicki. "Efficient coding of natural sounds," Nature neuroscience, 2002, 5.4: 8 pages.

Liao et al. "Large vocabulary automatic speech recognition for children," Sixteenth Annual Conference of the International Speech Communication Associates, 2015, 5 pages.

Lin et al. "Network in network," arXiv preprint arXiv, 2013, 1312.4400, 10 pages.

Mathieu et al. "Fast training of convolutional networks through ffts," CoRR, 2015, abs/1312.5851, 9 pages.

Palaz et al. "Analysis of cnn-based speech recognition system using raw speech as input," Proceedings of Interspeech, 2015, epfl-conf-210029, 5 pages.

Palaz et al. "Estimating phoneme class conditional probabilities from raw speech signal using convolutional neural networks," arXiv preprint arXiv: 2013, 1304.1018 : 5 pages.

Ranzato et al. "Unsupervised learning of invariant feature hierarchies with applications to object recognition," IEEE conference on Computer Vision and Pattern Recognition, 2007, 9 pages.

Rickard et al. "The gini index of speech," In Proceedings of the 38th Conference on Information Science and Systems, 2004, pp. 5 pages.

Rippel et al. "Spectral representations for convolutional neural networks," In Advances in Neural Information Processing Systems, 2015, 9 pages.

Sainath et al. "Learning filter banks within a deep neural network framework," IEEE workshop on Automatic Speech Recognition and Understanding, 2013, 6 pages.

Sainath et al. "Factored Spatial and Spectral Multichannel Raw Waveform CLDNNs," in Proc. ICASSP. IEEE, 2016, 5 pages.

Sainath et al. "Learning the Speech Front-end with Raw Waveform CLDNNs," in Proc. Interspeech. ISCA, 2015, pp. 1-5.

Sainath et al. "Speaker Location and Microphone Spacing Invariant Acoustic Modeling from Raw Multichannel Waveforms," in Proc. ASRU. IEEE, 2015, 7 pages.

Tuske et al. "Acoustic modeling with deep neural networks using raw time signal for lvcsr," Interspeech, 2014, 5 pages.

Variani et al. "Complex Linear Projection (CLP): A Discriminative Approach to Joint Feature Extraction and Acoustic Modeling," Submitted to Proc. ICML, 2016, 5 pages.

Variani et al. "Deep neural networks for small footprint text-dependent speaker verification," In Acoustics, Speech and Signal Processing, 2014, 5 pages.

Vasilache et al. "Fast convolutional nets with fbfft: A GPU performance evaluation," CoRR, 2014, abs/1412.7580, 17 pages.

Yu et al. "Exploiting sparseness in deep neural networks for large vocabulary speech recognition," IEEE International Conference on Acoustics, Speech and Signal Processing, 2012, 4 pages.

Zonoobi et al. "Gini index as sparsity measure for signal reconstruction from compressive samples," Selected Topics in Signal Processing, 2011, 5(5): 13 pages.

"Chapter 4: Frequency Domain and Fourier Transforms" [retrieved on Nov. 11, 2016]. Retrieved from the Internet: URL<https://www.princeton.edu/—cuff/ele201/kulkarni_text/frequency.pdf>. 21 pages.

"Convolution theorem," from Wikipedia, the free encyclopedia, last modified on Jun. 26, 2016 [retrieved on Nov. 11, 2016]. Retrieved from the Internet: URL<https://en.wikipedia.org/wiki/Convolution_theorem. 5 pages.

"Multiplying Signals" EECS20N: Signals and Systems. UC Berkeley EECS Dept. [retrieved on Nov. 11, 2016]. Retrieved from the Internet: URL<http://ptolemy.eecs.berkeley.edu/eecs20/week12/multiplying.html>. 1 page.

"Voice activity detection," from Wikipedia, the free encyclopedia, last modified on Jul. 23, 2015 [retrieved on Oct. 21, 2015]. Retrieved from the Internet: URL<http://en.wikipedia.org/wiki/Voice_activity_detection>, 5 pages.

Allen and Berkley, "Image method for efficiently simulating small-room acoustics," J. Acoust. Soc. Am. 65(4):943-950, Apr. 1979.

Benesty et al., "Microphone Array Signal Processing," Springer Topics in Signal Processing, 2008, 193 pages.

Brandstein and Ward, "Microphone Arrays: Signal Processing Techniques and Applications," Digital Signal Processing, 2001, 258 pages.

Burlick et al., "An Augmented Multi-Tiered Classifier for Instantaneous Multi-Modal Voice Activity Detection," Inferspeech 2013, 5 pages, Aug. 2013.

Chen et al., "Compressing Convolutional Neural Networks in the Frequency Domain," arXiv preprint arXiv:1506.04449, 2015, 10 pages.

Chuangsuwanich and Glass, "Robust Voice Activity Detector for Real World Applications Using Hannonicity and Modulation frequency," Interspeech, pp. 2645-2648, Aug. 2011.

(56) References Cited

OTHER PUBLICATIONS

Delcroix et al., "Linear Prediction-Based Dereverberation With Advanced Speech Enhancement and Recognition Technologies for the Reverb Challenge," REVERB Workshop 2014, pp. 1-8, 2014.
Dettmers, Tim, "Understanding Convolution in Deep Learning." Mar. 26, 2015, [retrieved on Nov. 11, 2016]. Retrieved from the Internet: URL<http://timdettmers.com/2015/03/26/convolution-deep-learning/>. 77 pages.
Donoho. "Sparse components of images and optimal atomic decompositions," Constructive Approximation, 2001, 17(3): 26 pages.
Eyben et al., "Real-life voice activity detection with LSTM Recurrent Neural Networks and an application to Hollywood movies," 2013 IEEE International Conference on Acoustics, Speech and Signal Processing (ICASSP); May 2013, Institute of Electrical and Electronics Engineers, May 26, 2013, pp. 483-487, XP032509188.
Ferroni et al., "Neural Networks Based Methods for Voice Activity Detection in a Multi-room Domestic Environment," Proc. of EVALITA as part of XIII AI*IA Symposium on Artificial Intelligence, vol. 2, pp. 153-158, 2014.
Gabor. "Theory of communication Part 1: The analysis of information," Journal of the Institution of Electrical Engineers-Part III: Radio and Communication Engineering, 1946, 93.26, 29 pages.
Ghosh et al., "Robust Voice Activity Detection Using Long-Term Signal Variability," IEEE Transactions on Audio, Speech, and Language Processing, 19(3):600-613, Mar. 2011.
Giri et al., "Improving Speech Recognition in Reverberation Using a Room-Aware Deep Neural Network and Multi-Task Learning," 2015 IEEE International Conference on Acoustics, Speech and Signal Processing (ICASSP), pp. 5014-5018, Apr. 2015.
Glasberg and Moore, "Derivation of auditory filter shapes from notched-noise data," Hearing Research, vol. 47, No. 1, pp. 103-138, Aug. 1990.
Glorot and Bengio, "Understanding the difficulty of training deep feedforward neural networks," Proceedings of the International Conference on Artificial Intelligence and Statistics (AISTATS'10), pp. 249-256, 2010.
Graves et al., "Speech Recognition With Deep Recurrent Neural Networks," Acoustics, Speech and Signal Processing (ICASSP), 2013 IEEE International Conference on, pp. 6645-6649, 2013.
Hain et al., "Transcribing Meetings With the AMIDA Systems," IEEE Transactions on Audio, Speech, and Language Processing, 20(2):486-498, Feb. 2012.
Heigold et al., "Asynchronous Stochastic Optimization for Sequence Training of Deep Neural Networks," 2014 IEEE International Conference on Acoustic, Speech and Signal Processing, pp. 5624-5628, 2014.
Hertel et al., "Comparing Time and Frequency Domain for Audio Event Recognition Using Deep Learning," arXiv preprint arXiv:1603.05824 (2016), 5 pages.
Hochreiter and Schmidhuber, "Long Short-Tenn Memory," Neural Computation, vol. 9, No. 8, pp. 1735-1780, 1997.
Huang et al., "An Analysis of Convolutional Neural Networks for Speech Recognition," Acoustics, Speech and Signal Processing (ICASSP), 2015 IEEE International Conference on. IEEE, Apr. 2015, pp. 4989-4993.
Hughes and Mierle, "Recurrent Neural Networks for Voice Activity Detection," Acoustics, Speech and Signal Processing (ICASSP), 2013 IEEE International Conference on, pp. 7378-7382, May 2013.
International Search Report and Written Opinion in International Application No. PCT/US2016/043552, dated Sep. 23, 2016, 12 pages.
Kello and Plaut, "A neural network model of the articulatory-acoustic forward mapping trained on recordings of articulatory parameters," J. Acoust. Soc. Am. 116 (4), Pt. 1, pp. 2354-2364, Oct. 2004.
Kim and Chin, "Sound Source Separation Algorithm Using Phase Difference and Angle Distribution Modeling Near the Target," in Proc. INTERSPEECH, 2015, 5 pages.
Maas et al., "Recurrent Neural Networks for Noise Reduction in Robust ASR," INTERSPEECH 2012, 4 pages, 2012.
Misra, "Speech/Nonspeech Segmentation in Web Videos," Proceedings of INTERSPEECH 2012, 4 pages, 2012.
Mitra et al., "Time-Frequency Convolutional Networks for Robust Speech Recognition," 2015 IEEE Workshop on Automatic Speech Recognition and Understanding (ASRU). IEEE, 2015, 7 pages.
Mohamed et al., "Understanding how Deep Belief Networks Perform Acoustic Modelling," in ICASSP, Mar. 2012, pp. 4273-4276.
Narayanan and Wang, "Ideal Ratio Mask Estimation Using Deep Neural Networks for Robust Speech Recognition," Acoustics, Speech and Signal Processing (ICASSP), 2013 IEEE International Conference on, pp. 7092-7096, May 2013.
Patterson et al., "An efficient auditory filterbank based on the gammatone function," in a meeting of the IOC Speech Group on Auditory Modelling at RSRE, vol. 2, No. 7, 1987, 33 pages.
Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, 2013.
Sainath et al., "Improvements to Deep Convolutional Neural Networks for LVCSR," in Automatic Speech Recognition and Understanding (ASRU), 2013 IEEE Workshop on, pp. 315-320, 2013.
Sainath et al., "Low-Rank Matrix Factorization for Deep Neural Network Training With High-Dimensional Output Targets," 2013 IEEE International Conference on Acoustics, Speech and Signal Processing. IEEE, 2013, 5 pages.
Sainath et al., "Reducing the Computational Complexity of Multimicrophone Acoustic Models with Integrated Feature Extraction," Interspeech 2016, 2016, 1971-1975.
Sak et al., "Long Short-Term Memory Based Recurrent Neural Network Architectures for Large Vocabulary Speech Recognition," arXiv:1402.1128v1 [cs.NE], Feb. 2014, 5 pages.
Sak et al., "Long Short-Term Memory Recurrent Neural Network Architectures for Large Scale Acoustic Modeling," in Proc. INTERSPEECH, pp. 338-342, Sep. 2014.
Schluter et al., "Gammatone Features and Feature Combination for Large Vocabulary Speech Recognition," Acoustics, Speech and Signal Processing, 2007. ICASSP 2007. IEEE International Conference on, pp. IV-649-IV-652, Apr. 2007.
Seltzer et al., "Likelihood-Mazimizing Beamforming for Robust Hands-Free Speech Recognition," IEEE Transactions on Speech and Audio Processing, 12(5):489-498, Sep. 2004.
Smith, Steven, "The Scientist and Engineer's Guide to Digital Signal Processing, Chapter 9: Applications of the DFT" 1997, 4 pages.
Soltau et al., "The IBM Attila speech recognition toolkit," in Proc. IEEE Workshop on Spoken Language Technology, 2010, Dec. 2010, pp. 97-102.
Stolcke et al., "The SRI-ICSI Spring 2007 Meeting and Lecture Recognition System," Multimodal Technologies for Perception of Humans, vol. Lecture Notes in Computer Science, No. 2, pp. 450-463, 2008.
Swietojanski et al., "Hybrid Acoustic Models for Distant and Multichannel Large Vocabulary Speech Recognition," Automatic Speech Recognition and Understanding (ASRU), 2013 IEEE Workshop on. IEEE, Dec. 2013, pp. 285-290.
Thomas et al., "Analyzing convolutional neural networks for speech activity detection in mismatched acoustic conditions," 2014 IEEE International Conference on Acoustics, Speech and Signal Processing (ICASSP), IEEE, May 4, 2014, pp. 2519-2523, XP032617994.
Thomas et al., "Improvements to the IBM Speech Activity Detection System for the DARPA RATS Program," Proceedings of IEEE International Conference on Audio, Speech and Signal Processing (ICASSP), pp. 4500-4504, Apr. 2015.
Van Veen and Buckley, "Beamforming: A Versatile Approach to Spatial Filtering," ASSP Magazine, IEEE, 5(2):4-24, Apr. 1988.
Weiss and Kristjansson, "DySANA: Dynamic Speech and Noise Adaptation for Voice Activity Detection," Proc. of INTERSPEECH 2008, pp. 127-130, 2008.

(56) References Cited

OTHER PUBLICATIONS

Yu et al., "Feature Learning in Deep Neural Networks—Studies on Speech Recognition Tasks," arXiv:1301.3605v3 [cs.LG], pp. 1-9, Mar. 2013.
Zelinski, "A Microphone Array With Adaptive Post-Filtering for Noise Reduction in Reverberant Rooms," Acoustics, Speech, and Signal Processing, 1988. ICASSP-88., 1988 International Conference on, vol. 5, pp. 2578-2581, Apr. 1988.
Zhang and Wang, "Boosted Deep Neural Networks and Multi-resolution Cochleagram Features for Voice Activity Detection," INTERSPEECH 2014, pp. 1534-1538, Sep. 2014.
'eecs.ucmerced.edu' [online] "Complex-valued Linear Layers for Deep Neural Network-based Acoustic Models for Speech Recognition," Izhak Shafran, Google Inc. Apr. 8, 2016 [retrieved on May 29, 2018] Retrieved from Internet: URL <http://eecs.ucmerced.edu/sites/eecs.ucmerced.edu/files/page/documents/2016-04-08-slides.pdf> 54 pages.
'slazebni.cs.illinois.edu' [online presentation] "Recurrent Neural Network Architectures," Abhishek Narwekar, Anusri Pampari, CS 598: Deep Learning and Recognition, Fall 2016, [retrieved on 2018-05-29] Retrieved from Internet: URL< http://slazebni.cs.illinois.edu/spring17/lec20_rnn.pdf> 124 pages.
'smerity.com' [online] "Explaining and Illustrating orthogonal initialization for recurrent neural networks," Jun. 27, 2016, [retrieved on 2018-05-29] Retrieved from Internet: URL< https://smerity.com/articles/2016/orthogonal_init.html> 8 pages.
Arjovsky et al. "Unitary evolution recurrent neural networks," Proceedings of the 33rd International Conference on Machine Learning, Jun. 2016, 9 pages.
Arjowsky et al. "Unitary Evolution Recurrent Neural Networks," arXiv 1511.06464v4, May 25, 2016, 9 pages.
Hastie et al. "Chapter 5: Basis Expansions and Regularization" The elements of statistical learning: data mining, inference and prediction, The Mathematical Intelligencer, 27(2), 2005, [retrieved on Jun. 15, 2018] Retrieved from Internet: URL<https://web.stanford.edu/~hastie/Papers/ESLII.pdf> 71 pages.
Hirose et al. "Generalization characteristics of complex-valued feedforward neural networks in relation to signal coherence," IEEE Transaction in neural Networks and Learning Systems, vol. 23(4) Apr. 2012, 11 pages.
Hirose. "Chapter: Complex-Valued Neural Networks: Distinctive Features," Complex-Valued Neural Networks, Studies in Computational Intelligence, vol. 32, Springer 2006, 19 pages.
Jing et al. "Tunable Efficient Unitary Neural Networks (EUNN) and their application to RNNs," arXiv 1612.05231v2, Feb. 26, 2017, 9 pages.
Jing et al. "Tunable Efficient Unitary Neural Networks (EUNN) and their application to RNNs," Proceedings of the International Conference on Machine Learning, Aug. 2017, arXiv 1612.05231v3, Apr. 3, 2017, 9 pages.
Kingma et al. "Adam: A method for stochastic optimization," arXiv 1412.6980v9, Jan. 30, 2017, 15 pages.
Linsker. "Perceptual neural organization; Some approaches based on network models and information theory," Annual review of Neuroscience, 13(1) 1990, 25 pages.
Mhammedi et al. "Efficient orthogonal parametrization of recurrent neural networks using householder reflections," Proceedings of the International Conference on Machine Learning, Jul. 2017, arXiv 1612.00188v5, Jun. 13, 2017, 12 pages.
Nitta. "Chapter 7:" Complex-valued Neural Networks: Utilizing High-Dimensional Parameters, Information Science Reference—Imprint of: IGI Publishing, Hershey, PA, Feb. 2009, 25 pages.
Palaz et al., "Estimating Phoneme Class Conditional Probabilities From Raw Speech Signal using Convolutional Neural Networks," in Proc. INTERSPEECH, 2014, 5 pages.
Shafran et al. "Complex-valued Linear Layers for Deep Neural Network-based Acoustic Models for Speech Recognition," Apr. 8, 2016, [retrieved Feb. 26, 2018] Retrieved from Internet: URL< http://eecs.ucmerced.edu/sites/eecs.ucmerced.edu/files/page/documents/2016-04-08-slides.pdf> 54 pages.
Varian et al. "End-to-end training of acoustic models for large vocabulary continuous speech recognition with tensorflow," Interspeech, Aug. 2017, 5 pages.
Wisdom et al. "Full-Capacity Unitary Recurrent Neural Networks," arXiv 1611.00035v1, Oct. 31, 2016, 9 pages.
Wisdom et al. "Full-Capacity Unitary Recurrent Neural Networks," Proceedings of Advances in Neural Information Processing Systems, Dec. 2016, 9 pages.

* cited by examiner

COMPLEX LINEAR PROJECTION FOR ACOUSTIC MODELING

FIELD

This application relates to speech recognition.

BACKGROUND

Various techniques can be used to recognize speech. Some techniques use an acoustic model that receives acoustic features derived from audio data.

SUMMARY

When performing speech recognition, some systems convolve audio data with multiple filters. Each convolution is a complex and computationally expensive process. To reduce computational demands, a system may convert the audio data to the frequency domain where the equivalent operation to convolution is a simple multiplication, which is much less computationally expensive. Therefore, to apply a filter, a system may convert the audio data to the frequency domain and multiples it by a frequency-domain representation of the filter.

To process the data further, speech recognition systems that have used frequency-domain equivalents for time-domain convolution typically convert the filtered audio data back to the time domain. The conversion is generally needed in order to perform a pooling operation. Many of the preferred pooling techniques for neural network processing, such as max pooling, do not have corresponding functions that are computationally efficient in the frequency domain. As a result, many neural network architectures for speech recognition require conversion of data from the frequency domain to the time domain in order to carry out pooling and perform further processing.

The techniques disclosed herein enable a speech recognition system to significantly improve computational efficiency by performing the equivalent of time-domain convolution and pooling in the frequency-domain. These operations are much more efficient than corresponding time domain operations. Further, unlike prior systems, there is no need to convert data to the time domain after the frequency domain convolution. The neural network layers of an acoustic model can be trained to predict phonetic unit likelihoods based on the frequency domain data rather than time-domain representations.

As discussed further below, the present speech recognition system may use complex linear projection (CLP). Before using CLP to recognize speech, the system generates one or more CLP filters in the frequency domain. A CLP filter may be based on a filter in the time domain, or may be otherwise determined during training of the speech recognition system. The CLP filter is a matrix where the values of the matrix correspond to the filter weights of a time-domain filter.

To use CLP to recognize speech, the audio data is converted to the frequency domain to produce a vector of audio data in the frequency domain. Both the CLP filter matrix and the vector of audio data in the frequency domain include complex numbers. The system multiples the CLP filter matrix by the vector of the audio data in the frequency domain. During the multiplication process, the system pools the data by summing the products of each value in each row of the CLP filter and the values in the frequency domain vector. Because of this pooling function, the equivalent to average weighted pooling can be performed efficiently in the frequency domain. This increases processing efficiency and avoids the need to convert back to the time domain to perform pooling. The system applies additional CLP filters to the vector of audio data in the frequency domain in the same manner, and performs other processing. The output is then provided to a neural network, e.g., one that has been trained as an acoustic model, that provides output used to generate a transcription of the audio data.

According to an innovative aspect of the subject matter described in this application, a method of complex linear projection for acoustic modeling includes the actions of receiving, by one or more computers, audio data corresponding to an utterance; generating, by the one or more computers, frequency domain data using the audio data; processing, by the one or more computers, the frequency domain data using complex linear projection; providing, by the one or more computers, the processed frequency domain data to a neural network trained as an acoustic model; and generating, by the one or more computers, a transcription for the utterance that is determined based at least on output that the neural network provides in response to receiving the processed frequency domain data.

This and other implementations may include one or more of the following optional features. The action of processing the frequency domain data using complex linear projection includes processing the frequency domain data for each input frame of audio data. The actions further include generating a convolutional filter with one or more real filter weights; and generating a frequency domain filter with one or more complex filter weights based on the convolutional filter. The action of processing the frequency domain data using complex linear projection includes applying the frequency domain filter to the audio data. The actions further include receiving an additional input frame of audio data corresponding to the utterance; generating additional frequency domain data using the additional input frame of audio data; applying the frequency domain filter with the one or more complex filter weights to the additional frequency domain data; and providing the filtered additional frequency domain data to the neural network. The action of generating the transcription for the utterance includes generating the transcription for the utterance based further on output that the neural network provides in response to receiving the filtered additional frequency domain data. The convolutional filter or the frequency domain filter are jointly trained using the neural network. The actions further include applying logarithmic compression to the processed frequency domain data before providing the processed frequency domain data to the neural network. The neural network trained as an acoustic model includes one or more long-short term memory layers and multiple hidden layers. The action of processing the frequency domain data using complex linear projection corresponds to weighted average pooling in time domain.

Other embodiments of this aspect include corresponding systems, apparatus, and computer programs recorded on computer storage devices, each configured to perform the operations of the methods.

The techniques disclosed herein may be optionally used to achieve one or more of the following advantages. For example, the computational complexity of a speech recognition process can be reduced while preserving or increasing accuracy. A neural network for speech recognition can be configured to operate using frequency domain data as an alternative to a convolutional neural network. The need to convert frequency domain information to time-domain information for further processing can also be avoided. For example, pooling can be performed in the frequency domain rather than in the time-domain.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
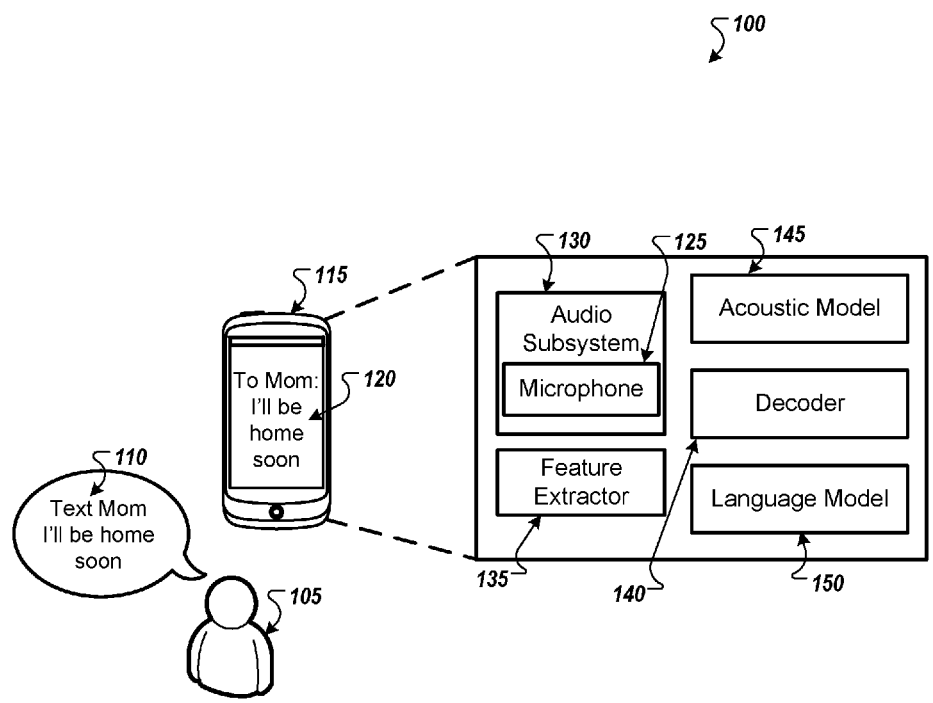
FIG. 1 illustrates an example speech recognition system.

FIG. 1 illustrates an example speech recognition system 100. Briefly, and as described in more detail below, a user 105 speaks an utterance 110. A computing device 115 receives the utterance 110 and performs speech recognition on the utterance 110. The computing device 115 displays the transcription 120 of the utterance on a display of the computing device 115.

As illustrated in the example shown in FIG. 1, the user 105 speaks the utterance 110 "Text Mom I'll be home soon" in the presence of the computing device 115. The user may have opened a messaging application on the computing device 115. Alternatively, the computing device 115 may be in a mode where the computing device 115 can receive and process detected speech such as voice commands. This mode may be activated by selecting a particular button on the computing device 115 or by the user 105 speaking a particular activation keyword or hotword.

The computing device 115 detects the utterance 110 through a microphone 125. The microphone 125 may be part of an audio subsystem 130 that receives and processes incoming audio data. The microphone 125 may provide analog data to the audio subsystem 130. The audio subsystem 130 may process the audio data by performing one or more of the following: converting the analog data to digital audio data, filtering the audio data, sample the audio data, compress the audio data, and any other similar audio processing techniques. The computing device 115 may be any type of computing device that is configured to detect and process sound such a mobile phone, tablet device, wearable device, desktop computer, smart speaker, laptop computer, smart appliance, or any other similar device.

As part of the speech recognition process, the audio subsystem 130 provides the processed audio data to the feature extractor 135. The feature extractor 135 derives descriptive features of the audio data from the processed audio data. The feature extractor 135 may reduce the dimensionality of the processed audio data and produces a characteristic feature vector with a lower dimensionality than the processed audio data received form the audio subsystem 130. The feature extractor 135 may analyze the processed audio data to suppress the characteristics of the ambient environment, such as back ground noise, and any characteristics added by the microphone 125 or the audio subsystem 130.

The feature extractor 135 provides the feature vectors to the decoder 140. The decoder 140 applies an acoustic model 145 and a language model 150 to identify the words of the utterance 110. The decoder 140 accesses and applies the acoustic model 145 to identify the most likely phonemes of the utterance 110. The decoder 140 accesses and applies the language model 150 to identify the most likely word sequences of the utterance 110. The decoder 140 identifies a most likely transcription 120 of the utterance 110. With a transcription 120 of the utterance 120 identified, the computing device 115 may display and/or process the transcription 120. For example, the computing device 115 may parse the transcription 120 to identify a command and a payload. The command may be to text mom and the payload may be the message, such as "I'll be home soon."

In some implementations, the speech recognition processing of the computing device 115 may be performed on a different computing device. For example, the computing device 115 may detect the utterance 110 through the microphone 125 and process the audio data using the audio subsystem 130. The computing device may then transmit, over a network, the processed audio data to server. The server processes the audio data received from the computing device in a similar fashion to the feature extractor 135 and decoder 140. The server generates a transcription of the audio data and transmits, over the network, the transcription 120 back to the computing device 115 for further processing and/or displaying on the display of the computing device 115.

Various speech recognition techniques discussed below can be used as alternatives to typical convolutional layers of neural networks. In some situations, convolutions may prove to be prohibitively expensive, especially when large filter kernels are applied. This application addresses the computational bottleneck imposed by convolutions in the context of CNNs by utilizing a linear transform with complex weights. The Fourier transform is a means to represent a real valued vector in a complex form without losing information. Such an isomorphism provides an efficient way to perform a convolution using element-wise multiplication, and eliminates the need for parameter tuning of the convolution filter size. Furthermore, such a representation allows for analogous pooling operations typically used in CNNs without leaving the complex domain. This application will describe that the CLP is equivalent to a convolution followed by weighted average pooling. This allows for typical layers of a CNN to be computed in linear time. The CLP transform was compared with the CNN model in three audio recognition tasks and shown to achieve competitive performance while significantly reducing the total number of parameters and computations.

Convolutional neural networks (CNNs) pose a quality-time tradeoff in which high performance may be compromised in the interest of running time and choice of parameters. In the absence of a systematic approach for choosing optimal convolution filter support size, this value is may be large enough to capture fine temporal information of the input signal, which inherently increases the total number of computations. The convolution theorem between circular convolution in the time domain and element-wise multiplication in the frequency domain has been used to speed up CNNs. The system described below computes discrete Fourier transforms (DFT) of the input and convolutional filters, and then approximates the convolutional activations by the element-wise multiplication of the DFT of the input and filter weights. Finally, the system computes the inverse Fourier transform to apply pooling in time domain. For an input window size of n, this reduces the total number of computations from $n^2$ using direct approach to $2n \log(n)+n$. In some implementations, the system may reduce the CNN computational complexity to $n \log(n)+n$ by learning filters directly in the frequency domain.

A linear transform with complex weights can serve as an alternative representation of convolutional neural networks with real weights. Because there is a one-to-one mapping between complex weight vectors and convolutional filter weights, this representation eliminates the need for finding the optimum convolution filter support size. Furthermore, this representation allows learning filter weights and pooling both in the same space which reduces the number of computations to order n per convolution filter. As discussed below, complex linear projection compares favorably with CNNs in the challenging task of joint feature extraction for speech recognition, speaker verification, and music genre recognition.

Complex linear projection can be an effective alternative for convolution. A convolutional layer convolves input x with a filter $w_i$ parameterized by filter support size $d_i$ and stride $s_i$, to output $y_i = x * w_i$. For audio applications, the support size of $w_i$ may be on par with the input size, $d_i \approx n$, to capture long temporal dependency structures in the time signal. For a CNN layer of p nodes, this makes the number of additions and multiplications needed for convolution filters $pn^2$. In some implementations, convolution may require tuning the support size. The description below regarding selecting parameters demonstrates the effect of support size on the performance of convolutional-based models. In some implementations, a convolutional layer is followed by a pooling layer to further compress and remove the redundant information.

To reduce the complexity of the convolution operation, the above process is typically sped up in the frequency domain by taking the Fourier transform of input and convolution weights, doing element-wise multiplication and finally applying the inverse Fourier transform to do pooling. Going back and forth between the input and output spaces (also called time and frequency space, respectively) can be avoided by performing all operations in the complex space. The system performs the operations in the complex space by first representing the real valued convolution filter weights with an equivalent representation in the complex space, and then applying the analogous operation to convolution, followed by the analogous pooling operation. The description of these steps is below.

The use of complex linear projection takes advantage of isomorphism between the real space and complex space. Consider a transform $f_n: R^n \to C^{n/2+1}$ that for a given n defines an isomorphism between n dimensional vectors in real space and the $1+n/2$ dimensional vectors in the complex space. The discrete Fourier transform can be leveraged to construct such $f_n$. For a real valued input, the Fourier transform has a Hermitian symmetric complex output. Given x is an element of $R^n$, $f_n(x)$ is defined to be the lower half of the Fourier transform, $F(x)$. In this case, $f_n$ is linear and invertible. For an input x and convolutional filter $w_i$, n may be the size of x and define $X=f_n(x)$ and $W_i=f_n(w_i)$. Although $w_i$ has only $d<n$ non-zero values, to apply $f_n$, $w_i$ is treated to be in $R^n$ by zero padding.

The convolution theorem states the duality between circular convolution $\circledast$ and element-wise multiplication $\odot$ under the Fourier transform. The map $f_n$ above also preserves this duality. More precisely, for a convolutional filter $w_i$ and input x, $f_n(w_i \circledast x) = f_n(w_i) \odot f_n(x)$. Thus, element-wise multiplication in the complex space can be used for the equivalent of convolution in the real space.

Frequency pooling is advantageous in many speech recognition systems. In some implementations, the system may use deterministic functions such as max, average, or $I_p$ pooling to aggregate the multi-dimensional convolution outputs into a scalar. When the convolution has been optimized by applying the Fourier transform, applying pooling may require returning to the input space through an inverse Fourier transform. In some implementations, returning to the input space through an inverse Fourier transform may not be necessary, however. Parseval's theorem, demonstrates the equivalence of $I_2$ pooling in time and frequency space: $I_2^2(x) = I_2^2(F(x))$. For operations such as max or $I_{p>2}$ norm, the system may compute the inverse Fourier transform to apply pooling over the convolution output. As will be described below, the system uses summation in the frequency domain for pooling. Denoting $y_i$ to be the convolution output, the proposed summation pooling in frequency is formulated as $\Sigma_{=0}^{\square/2} \square\square (\square)[\square] = \Sigma_{=0}^{\square/2} \square\square (\square\square \circledast \square)[\square] = \Sigma_{=0}^{\square/2} \square\square ((\square\square) \odot \square\square (\square))[\square]$. This operation has the advantage that the final model with p convolution filters can be expressed as a projection of X into a lower dimensional space, through a matrix vector multiplication which can illustrate the goal of feature extraction, projection.

For real input x is an element of $R^n$, the complex linear projection (CLP) transform is defined as:

$$Y = WX, \text{ where } W \in C^{P \times (n/2+1)} \text{ and } X = f_n(x). \tag{1}$$

Each element i of Y can be written as:

$$Y_i^{CLP} = \sum_{j=0}^{n/2} W_{ij} X_j = \sum_{j=0}^{n/2} (f_n(w_i) \odot f_n(x))[j] = \sum_{j=0}^{n/2} (f_n(w_i \odot x))[j] \tag{2}$$

where $W_i$ is the i'th row of W and $w_i$ is the equivalent representation of $W_i$ in real space. Since $f_n$ is an isomorphism, such representation exists. The inner argument of the summation in equation 2 is equivalent to a convolution in the input domain of $f_n$ and the summation can be interpreted as pooling in that space.

The following section discusses the equivalence of complex linear projection in real space. Lemma 1. Summation in the frequency domain is equivalent to weighted average pooling in the time domain. More precisely, for any v that is an element of $R^n$ $$\sum_{k=0}^{n/2} f_i(v)[k] = \sum_{l=0}^{n-1} \alpha[v] \tag{3}$$

where, $$\alpha_l = \begin{cases} \frac{n}{2} + 1 & l = 0 \\ \coth\left(j\frac{\pi l}{n}\right) & \mod(l, 2) = 1 \\ 1 & \mod(l, 2) = 0, l \neq 0 \end{cases} \quad (4)$$

This may be proven by the geometric sum.

$$\sum_{k=0}^{N} X_k = \sum_{k=0}^{N} \sum_{n=0}^{2N-1} x[n] \exp\left(-j\frac{2\pi k}{2N}n\right)$$

$$= \sum_{n=0}^{2N-1} x[n] \left( \sum_{k=0}^{N} \exp\left(-j\frac{\pi n}{N}k\right) \right)$$

$$= (N+1)x[0] + \sum_{n=1}^{2N-1} x[n] \left( \frac{\exp\left(-j\frac{\pi n}{N}(N+1)\right) - 1}{\exp\left(-j\frac{\pi n}{N}\right) - 1} \right)$$

$$= \sum_{n=0}^{2N-1} \alpha_n x[n].$$

Proposition 1. The projection in the frequency domain is equivalent to a convolution layer of size p followed by a weighted average pooling with the weights given in equation 4:

$$\sum_{j=0}^{n} W_{ij} X_j = \sum_{j=0}^{n-1} \alpha_j (w_i \circledast x)[j] \quad i = 1, \ldots, p \quad (5)$$

where $x = f_n^{-1}(X)$ and $w_i = f_n^{-1}(W_i)$ are equivalent representations of X and $W_i$ in the input domain of $f_n$, and p is the projection size.

$$Y_i^{CLP} = \sum_{j=0}^{n/2} (f_n(w_i) \odot f_n(x))[j] = \sum_{j=0}^{n/2} (f_n(w_i \circledast x))[j] = \sum_{j=0}^{n-1} \alpha_j (w_i \circledast x)[j] \quad (6)$$

which is directly concluded by the application of Lemma 1 and the duality theorem.

Figures 1A, 1B, 1C:
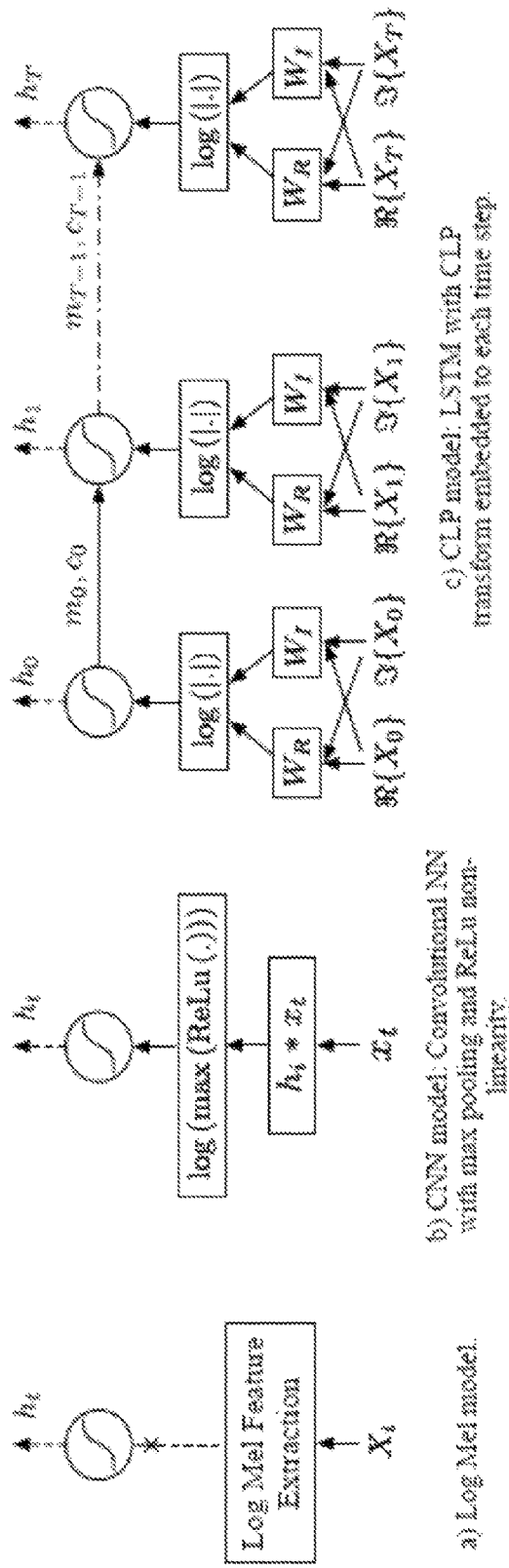
FIG. 1A illustrates an example timestep of a Long Short Term Memory (LSTM) model with Log Mel features.
FIG. 1B illustrates an example timestep of an LSTM model with a Convolutional Neural Network (CNN) transform.
FIG. 1C illustrates example timesteps of an LSTM model with Complex Linear Projection (CLP) transforms.

Referring to FIGS. 1A-1C, three different feature extraction techniques are represented. In FIG. 1A, some automatic speech recognition (ASR) and music recognition systems may use manually defined features like log Mel.

In FIG. 1B, an alternative feature extraction technique is represented. Instead of using predetermined features like log Mel features, a speech recognition system may use deep neural networks in data-driven techniques which jointly estimate features combined with the recognition process. In these implementations, the first few layers of the network are designed to learn the features directly from a raw waveform. The architecture may include a convolutional layer followed by a pooling layer. The success of the resulting model may depend on the choice of convolutional and pooling layer parameters. In some implementations, the acoustic modeling (AM) task may use a raw waveform model. In this model, the Log Mel feature extraction block of FIG. 1A is replaced by CNN transform across the timesteps of the Long Short Term Memory (LSTM) cells. FIG. 1B illustrates the CNN model in which the CNN transform includes a convolution layer followed by a ReLu, a max pooling layer, and finally a logarithmic nonlinearity.

FIG. 1C illustrates CLP transforms that are integrated into the timesteps of a LSTM model. Since the rest of the network parameters are real, the magnitude of the CLP activations Y=WX is taken and passed to the logarithmic compression. The transform weights $W=W_R+jW_I$ are shared across timesteps and learned by backpropagation of the gradients from a unique recognition loss.

The complex layer is implemented using four linear matrix vector multiplications. More precisely |Y| is calculated as:

$$|Y|=[\Re\{Y\}^2+\Im\{Y\}^2]^{1/2}, \Re\{Y\}=W_R X_R - W_I X_I,$$
$$\Im\{Y\}=W_R X_I + W_I X_R \quad (7)$$

As discussed below, the CLP model provides a number of advantages over the log Mel model and the CNN model. For any of the three models, the input audio for these three models can be segmented, e.g., with the window size of 512 samples, $x_t$ is an element of $R^{512}$, and frame shift of 160 samples. The 512 point FFT was computed to derive $X_t$. For comparisons of the models, the feature dimension input to LSTM cell per timestep is set to have same size for all three models. For this, the number of filters in the Log Mel model, number of nodes in the CNN layer and number of rows of the complex projection matrix are set to 128. Additional details regarding the models and datasets used for comparison is discussed below.

Figure 2:
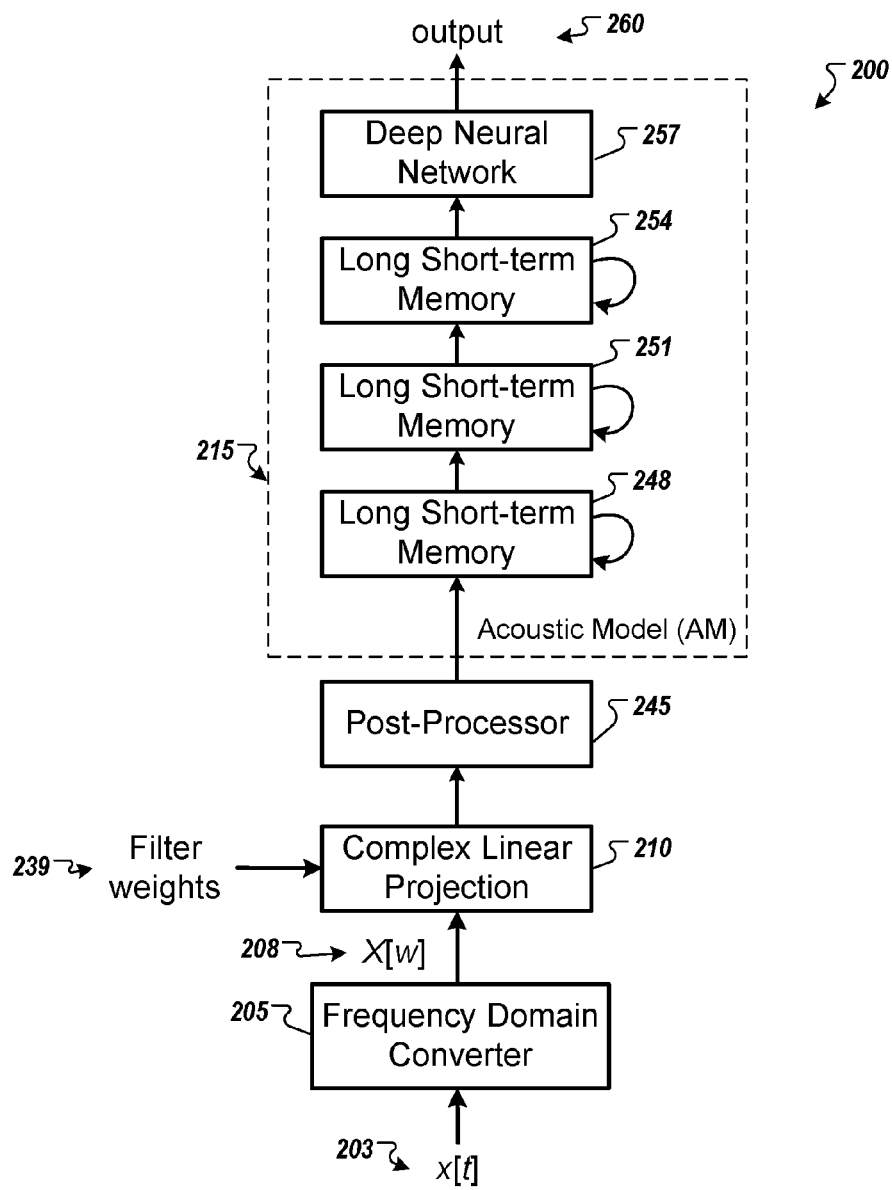
FIG. 2 illustrates an example speech recognition architecture using complex linear projection.

FIG. 2 illustrates an example speech recognition system 200 using complex linear projection. Briefly, and as described in more detail below, the system 200 receives audio data 203 that may be received from a microphone detecting speech and an audio subsystem processing the detected speech. The system 200 processes the audio data 203 through a frequency domain converter 205, a complex linear projection module 210, a post processor 245, and an acoustic model 215 to generate an output 260 that corresponds to the phonemes of the audio data 203.

To process the audio data 203, the system processes individual frames of the audio data 203 as the system receives the audio data. Each input frame may correspond to a few milliseconds (e.g., 10 ms, 25 ms, or 50 ms, etc.) of audio data processed by an audio subsystem, for example, the audio subsystem 130 of FIG. 1. Each input frame of audio may be represented by a vector with a dimension of n. The system initially processes the input frame by converting the input frame to the frequency domain using the frequency domain converter 205. The frequency domain converter 205 converts the input frame of audio to the frequency domain by applying a Fourier transform, e.g., a fast Fourier transform (FFT). The output of the frequency domain converter 205 is the frequency domain data 208 that is a vector that includes both real and imaginary components.

The complex linear projection module 210 receives the frequency domain data 208. The system also accesses filter weights 239 that specify the parameters for a filter used by the complex linear projection module 210. Generally, the filter weights 239 have been previously determined during the process of training the acoustic model. In some implementations, the filter weights 239 describe multiple different filters, for example, different filters can be learned for different frequency ranges. The complex linear projection module 210 applies each frequency domain filter to each frequency domain vector 208 received from the frequency domain converter 205. In some implementations, the frequency domain filter is a matrix where each of the values in the matrix corresponds to a filter weight that includes both real and imaginary components. The complex linear projection module 210 multiples the frequency domain filter matrix by the frequency domain data 208, which is a vector. The resulting vector is the complex linear projection vector of the frequency domain data 208. The complex linear projection vector includes both a real component and an imaginary component. Each row of the filter matrix represents a filter. As an example, the filter matrix is three rows by four columns where three filters each filter four frequency components. The element located in the third row and the second column ($w_{32}$) specifies how the frequency bin of the second column is weighted by the filter of the third row.

By multiplying the frequency domain filter by the frequency domain data 208, each value in the complex linear projection vector corresponds to the sum of a corresponding row of filter weights times each corresponding value in the frequency domain data 208. For example, to calculate the first value in the complex linear projection vector, the complex linear projection module 210 calculates the product of the filter weight in the first column and first row of the frequency domain filter and the first value in the frequency domain data 208. The complex linear projection stage 210 calculates the product of the filter weight in the second column and first row of the frequency domain filter and the second value in the frequency domain data 208. The complex linear projection stage 210 continues calculating the products of each filter weight and frequency domain data pair for the first row of the frequency domain filter. The complex linear projection module 210 sums the resulting products to calculate the first value in the complex linear projection vector. By summing the resulting products, the complex linear projection module 210 is performing a pooling operation in the frequency domain that is equivalent to weighted average pooling in the time domain. The complex linear projection module 210 operate entirely in the frequency domain and do not have to convert back to the time domain to perform a pooling operation. In other words, the complex linear projection module 210 performs a matrix vector multiplication where both matrix and vector values are complex values. Therefor a particular element of the product vector is based on a summation of the element-wise multiplication of a row of the matrix and the vector.

The system 200 provides the output of the complex linear projection module 210 to the post processor 245. In some implementations, the post processor 245 reduces the dimensionality of the vector received from the complex linear projection module 210. Reducing the dimensionality reduces the need for subsequent LSTM layers. In some implementations, the post processor performs logarithmic compression on the vector received from the complex linear projection module 210. To perform logarithmic compression, the post processor 245 computes the absolute value of each value in the vector received from the complex linear projection module 210. The absolute value corresponds to the square root of the sum of (i) the square of the real part and (ii) the square of the imaginary part. In other words, the absolute value corresponds to the distance that the value in the vector received from the complex linear projection module 210 is from the origin in the complex plane. The post processor 245 then computes the logarithm of the absolute value. The result is a vector with only real values.

The output vector of the post processor 245 is passed to LSTM layers 248, 251, and 254, which are appropriate to modeling the signal with respect to frequency. In some implementations, the system 200 trains the LSTM layers 248, 251, and 254 using frequency domain data instead of time data. In some implementations, three LSTM layers may be used to model the signal. In some implementations, each LSTM layer may include 832 cells and a 512 unit projection layer for dimensionality reduction. In some implementations, greater than three LSTM layers, including fewer cells, may alternatively be used. The output of the LSTM layers 248, 251, and 254 is provided to one or more deep neural network (DNN) layers 257.

The layers that are included in one or more DNN layers 257 may be fully-connected and, in some implementations, may each have 1,024 hidden units. The other layers of the system 200 may be trained jointly with the acoustic model 215. During training, the acoustic model 215 may be unrolled for training with truncated backpropagation through time (BPTT). In some implementations, the output state label may be delayed by one or more frames, as information about future frames may enhance the accuracy of predictions associated with a current frame.

In some implementations, the Mel filter banks are set of narrow band filters equally spaced in the Mel frequency scale. Both the CNN and CLP model are able to learn such a non-linear scale with set of narrow band filters. In some implementations, the CLP filters are more concentrated around the non-linear curve compare to the CNN alternative. The CLP model may be configured for multi-channel use. By concatenating the $X_t$ vectors of multiple channels, the CLP model is able to configure the optimal linear combination of channel information.

Time representation of convolution filters may require proper choice of filter support size. For time-varying signals like sound, this parameter may have a role in the performance of recognition model. In some implementations, sweeping the filter support size affects the speech recognition performance. In some implementations, the minimum word error rate (WER) may be achieved when the filter support size is chosen to be at least 80% of the window size. Applying the convolution as an element-wise multiplication in the complex domain removes the necessity of choosing a support size, reducing the network's hyperparameter space. This is due to the fact that the model learns the weights within 1+n/2 complex weights per filter without any constraint on how the time representation should be.

The longer a convolutional filter support size, the greater the computational cost. An implementation of p filters in the time domain with kernel size of d and stride of one for an n-point signal and full convolution requires 2pd×(n+d+1)≈2pn² operations. With an FFT speed up, this decreases to p(2n log(n)+n); one FFT and one inverse FFT computation per filter plus element-wise multiplication in the frequency domain. For the CLP model, this reduces to 8pn operations; four matrix vector multiplications. This reduction in the number of operations is due to the direct representation of the filters in the complex domain and the proposed frequency pooling which eliminates the need to compute an extra FFT and inverse FFT. This reduction leads to a factor of kernel size difference between run-time of the same operation in the time and frequency domains. The first two columns of Table 1 compares the total number of parameters as well as addition and multiplication operations in the CNN and CLP transform. The baseline CLP transform with a full matrix reduces the number of computations by a factor of 55, but has slightly more parameters.

TABLE 1

Computation efficiency.

| Model | Raw | CLP baseline | CLP constrained |
|---|---|---|---|
| # params | 45K | 66K | 5.12K |
| # add-mult | 14.51M | 263.17K | 40.96K |

The comparison of time and frequency representation of the filters is also appealing from a sparsity perspective. The Gabor limit states the dual of band limited frequency filters are wide band in the time domain and vice versa. For some auditory filters, these frequency filters are narrow band in the frequency domain. So, the time representation is expected to have more nonzero entries compared to the counterpart frequency representation. In other words, the frequency representation of the filters tend to be sparser compared to their representation in the time domain. The tendency of filters to be sparser in the frequency representation with CLP transform greatly facilitates optimization, reduces 170 the total number of parameters and speeds up run time due to fewer computational operations.

The Lorenz curve may be used to compare the sparsity of the CNN and CLP models. For a sorted n dimensional vector v and index i, $0 \leq i \leq n$, the Lorenz curve is defined within the support interval of (0, 1) by $$L_v\left(\frac{i}{n}\right) = \frac{\sum_{j=1}^{i}|v_j|}{\sum_{j=1}^{n}|v_j|}.$$

This curve may be used for sparsity measure in various signal processing tasks. The representation $v_1$ may be sparser than an alternative representation $v_2$, if the Lorenz curve $L_{v1}$ is under the curve $L_{v2}$. While both w and F(w) encodes the same information, the Fourier representation is relatively sparser that its time domain counterpart. Furthermore, learning the weights directly in the complex space leads to much sparser representation.

Various extensions of the CLP model can be made. One example is a regularized CLP technique. Due to the sparse nature of filters in the frequency domain it may be beneficial to inject more sparsity into the CLP model. The l1 norm provides a computationally a possible form of regularization. The CLP model trained with l1 regularization converges to significantly sparser model compare to the non-regularized CLP model. The same effect may be obtained by learning only a subset of weights in the CLP matrix. In other words, introduce hard zeros by constraining a subset of weights to zero. As the third column of Table 1 shows, the hard zero method may reduce the total number of parameters and computations.

Direct learning of the isomorphism $f_n$. In the description above, $f_n$ was constructed to map the real valued input x into the complex domain to apply the subsequent CLP transform. $f_n$ was constructed based on the Fourier transform, so it is linear and thus can be integrated to the CLP transform and learned jointly as part of the network training, so $Y = W f_n(x) = W'x$. After training by randomly initializing W', the network learned a representation with similar properties to the Fourier transform. Similar to the Fourier transform, each row of W' looks like a bandpass filter with a different center frequency. In addition, there appears to be a phase difference between the real and imaginary components of each row. In the case of the Fourier transform, this phase difference corresponds to $\pi/2$, the phase difference between the sin and cosine functions. In some implementations, the phase differences for all rows in W' is concentrated around $\pi/2$. Furthermore, the rows of W' make a nearly orthogonal basis. The curve shows that more than 90% of the pairs of distinct rows of W' have a normalized dot product less than 0.02. This property may also be observed for the Fourier transform, where the matrix is fully orthogonal.

The CLP transform is embedded into the timesteps of a LSTM to jointly optimize the filter bank and recognition parameters for three audio recognition tasks: speech, speaker, and music recognition. The experiments are designed to evaluate CLP in three aspects, (1) effectiveness of CLP to achieve state-of-the-art performance using Log Mel and CNN models, (2) benefits of learning language dependent features to avoid feature engineering, and (3) benefits of joint training of features and recognition model for non-speech recognition tasks like speaker and music recognition.

Various speech recognition experiments discussed below used three datasets: (1) spontaneous speech, anonymized and human transcribed voice search data that included multichannel American English (en_us), consisting of 2,000 hours recorded from 8-channel linear microphone array; (2) Taiwanese Mandarin (cmn_hant_tw) speech consisting of more than 30,000 utterances that were transcribed; and (3) High Pitch (HP) speech, with 3,000 hours of audio, 40% of which are children's speech and 60% are adult speech. The test sets for each language are separately human-transcribed voice search data of about 25 hours. The speaker verification task was evaluated on a set of text dependent prompts such as "Ok computer" utterances collected from voice search logs in two languages, ko_kr (2 million utterances) and ja_jp (12 million utterances). Finally, the music recognition task was evaluated on dataset consisting of 25,000 songs of length 29 second each annotated with 188 tags. The training set includes 14,000 songs while the test set contains the rest.

A recognition model using Log Mel features was utilized to compare CNN and CLP transforms. The model consists of 3 LSTM layers followed by a ReLu and a Linear layer. The CNN and CLP models were embedded to timesteps of LSTM as in FIGS. 1A and 1B replacing the Log Mel feature extraction block in FIG. 1C. The number of CNN layer nodes and the projection size in the CLP model weight matrix may be equal to the Log Mel feature dimension per timestep. Each timestep is 32 msec long which consists of 512 samples. The timesteps have 22 msec overlap. The convolution filter support size may be 352, the minimal size for the lowest WER. The CNN and CLP weights are trained jointly with the recognition loss which is cross entropy for the speech and music tasks and logistic regression loss using a model for the speaker verification task. All models may be trained using asynchronous SGD training with 200 multi-core machines.

Four variants of the CLP model with summation and $l_2$ pooling are compared in terms of WER in Table 2. The summation pooling outperforms the $l_2$ pooling. Both sparsity injection approaches boost CLP performance by about 2% relative. In some implementations, the l1 regularization requires less parameter tuning.

TABLE 2

Word Error Rate (WER) for variants of the CLP models on en_us dataset.

| MODEL | SUMMATION POOLING | | | $l_2$ POOLING |
|---|---|---|---|---|
| | l1 REG. | HARD ZEROS | | |
| 32 MSEC | 23.2 | 22.8 | 22.9 | 23.8 |

The first two columns of Table 3 present the WER performance of Log Mel, CNN and CLP models on the en_us task for single and two channel models. For the first three rows, the feature dimension per timestep is set to 128 per channel. While the CNN model may lag behind the Log Mel performance for single channel, the CLP model WER is on par with the Log Mel model. In the two 254 channel case, the CLP model may outperform both Log Mel and CNN which can be explained by the fact that CLP model integrates speech phase information because of the complex weight representation. Furthermore, increasing the number of filters by a factor of 10 may benefit the CLP model by an additional 2-4% relative improvements over the Log Mel model. Increasing filterbank size may not be possible for the Log Mel model with the same size FFT since there is a possibility to have one or no FFT point per filter. In some implementations, increasing number of filters for the CNN model may not be feasible due to the computational cost.

TABLE 3

WER for the speech recognition tasks across different models and languages.

| MODEL | EN_US | | | |
|---|---|---|---|---|
| | 1 CHANNEL | 2 CHANNEL | HIGH PITCH | CMN_HANT |
| LOG MEL | 22.8 | 21.3 | 16.6 | 17.2 |
| CNN | 23.4 | 21.2 | 16.3 | 16.8 |
| CLP | 22.8 | 20.9 | 16.4 | 16.6 |
| CLP (10 × p) | 22.2 | 20.2 | — | — |

For the languages which use tone to distinguish lexical or grammatical meaning, speech recognition may involve extensive feature engineering. The tonal features like pitch are appended to the Log Mel features to leverage the inefficiency of this representation for containing such information. Joint training of filterbank parameters allows the model to directly extract necessary information from the signal which avoids feature engineering. The last two columns of Table 3 illustrate this property for two tonal tasks, high pitch and Taiwanese mandarin datasets. Both CNN and CLP models may improve the Log Mel model in both tasks. In some implementations, they offer around 12% relative improvement over the Log Mel model for mandarin task. The pitch algorithms have a large number of hyper-parameters and are difficult to tune. This may be eliminated using a joint feature extraction approach like CNN or CLP.

While Log Mel features may have been parameterized for WER minimization, they may also be used for different audio tasks like speaker verification and music recognition. Table 4 illustrates the effectiveness of CLP as feature extractor for these two tasks. For Japanese speaker verification task, the CLP transform may have a 30% relative improvement over the baseline Log Mel model. The gap between the baseline Log Mel and the CLP may be smaller for Korean speaker verification and music genre recognition tasks. This might be due to smaller training set size for these two tasks compare to the Japanese task. The CLP matrix learned for these tasks are different from the one learned for the speech recognition task.

TABLE 4

Recognition accuracy (the higher, the better) for end to end speaker verification and music recognition.

| MODEL | SPEAKER VERIFICATION | | MUSIC RECOGNITION |
|---|---|---|---|
| | KO_KR | JA_JP | |
| LOG MEL | 96.4 | 94.48 | 83.52 |
| CLP | 96.3 | 96.11 | 84.54 |

Figure 3:
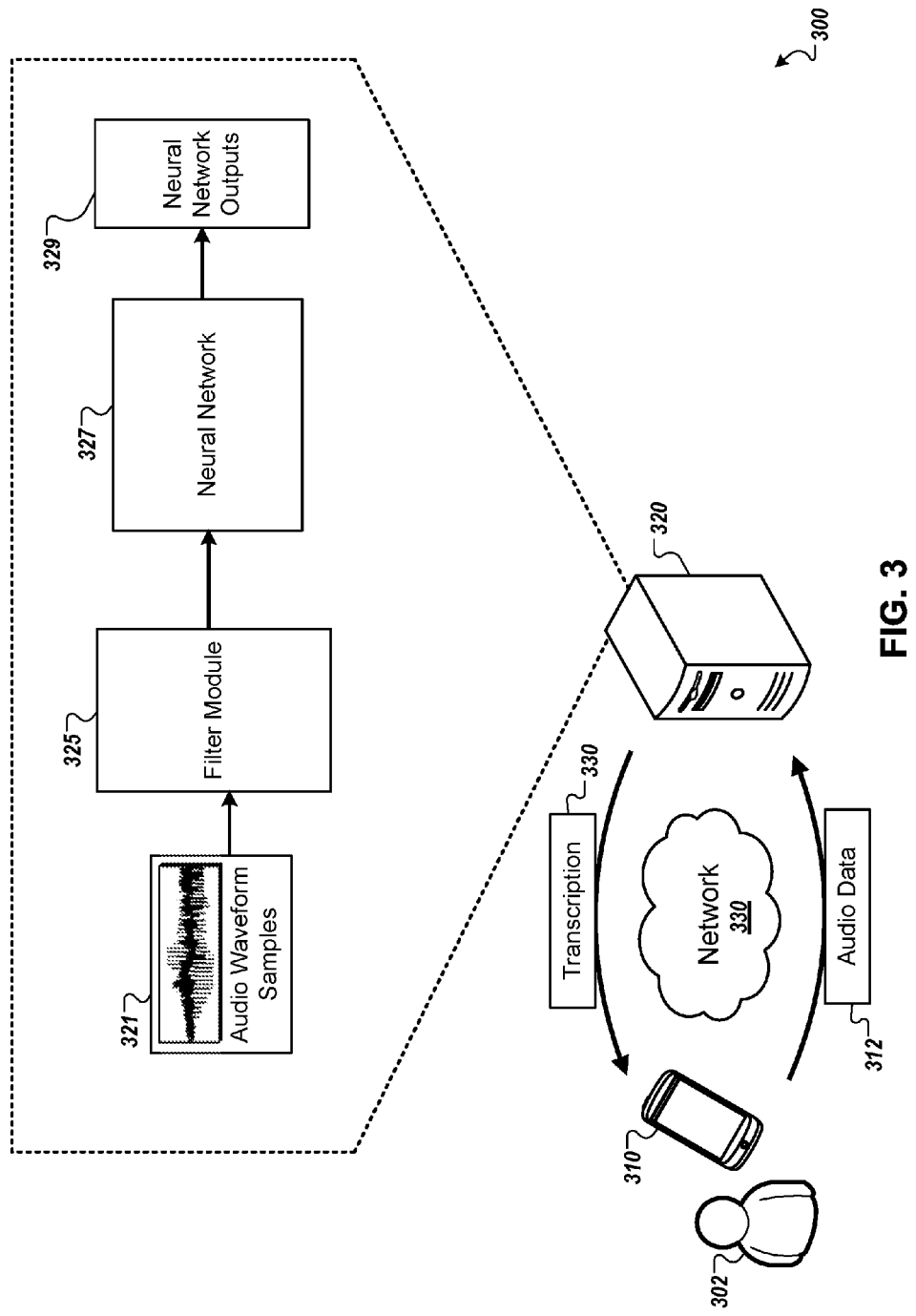
FIG. 3 illustrates an example system for speech recognition using complex linear projection.

FIG. 3 is a block diagram that illustrates an example system 300 for speech recognition using neural networks. The system 300 includes a client device 310, a computing system 320, and a network 330. In the example, the computing system 320 provides information about an utterance to the filter module 325. The filter module 325 performs processing, such as feature extraction using a learned filter and pooling, in the frequency domain. The output of the filter module 325 is provided to the neural network 327, which can represent an acoustic model or other speech recognition model. The computing system 320 uses output from the neural network 327 to identify a transcription for the utterance.

In the system 300, the client device 310 can be, for example, a desktop computer, laptop computer, a tablet computer, a wearable computer, a cellular phone, a smart phone, a music player, an e-book reader, a navigation system, or any other appropriate computing device. The functions performed by the computing system 320 can be performed by individual computer systems or can be distributed across multiple computer systems. The network 330 can be wired or wireless or a combination of both and can include the Internet.

In the illustrated example, a user 302 of the client device 310 speaks, and the client device 310 records audio that includes the speech. The client device 310 transmits the recorded audio signal 312 to the computing system 320 over the network 330.

The computing system 320 receives the audio signal 312 and obtains audio waveform samples 321. For example, the computing system 320 may identify a set of audio waveform samples 321 that represent a time window of audio signal 312. These audio waveform samples may be similar to input frames that have been described above in reference to FIG. 2.

The computing system 320 may provide audio waveform samples 321 to a filter module 325. The filter module 325 may include features such as the frequency domain converter 205, complex linear projection module 210, and post processor 245 of FIG. 2. As such, the filter module 325 may generate feature vectors that each represent frequency domain data with one of the filters being applied during the complex linear projection stage for each audio input frame.

During the training of the neural network, the computing system 320 learns a mapping between a window of a signal x into a label class y. In some implementations, the computing system 320 extracts some features from the signal x using a feature extraction method, f. This extraction may be independent of the neural network training and map each signal x to f(x) through the method f. The parameters of the feature extraction method f may be fixed and independent of any training data.

The computing system 320 uses a matrix vector multiplication where parameters of the feature extraction method f may be jointly trained with the neural network. By converting the signal x to the frequency domain and using a filter matrix that is related, for example, by the Fourier transform, to f(x), the elements of the filter matrix are trained jointly with the rest of the neural network because the feature extraction method f may be jointly trained with the neural network. In this instance, computing system 320 performs the equivalent of convolution followed by average pooling in the time domain.

The computing system 320 provides output of the filter module 325 to the neural network 327. The neural network 327 has been trained to act as an acoustic model. For example, the neural network 327 indicates likelihoods that frequency feature representations correspond to different speech units when the frequency feature representations are output by filter module 325 and based on audio waveform samples 321. The neural network 327 may, for instance, correspond to the acoustic model stage 215, as described in association with FIG. 2 above.

The neural network 327 produces neural network outputs 329, which the computing system 320 uses to identify a transcription 330 for the audio signal 312. The neural network outputs 327 indicates likelihoods that the speech in a particular window, for example, $w_i$ corresponding an acoustic feature vector $v_1$, within the audio waveform samples 322 corresponds to specific phonetic units. In some implementations, the phonetic units used are phones or components of phones, also referred to a phonemes. In this example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio waveform samples 321, or fewer than all of the phones that may occur. Each phone can be divided into three acoustic states.

The neural network outputs 327 can provide predictions or probabilities of acoustic states given the data included in the audio waveform samples 822. The neural network outputs 329 can provide a value, for each state of each phone, which indicates the probability that acoustic feature vector $v_1$ represents the particular state of the particular phone. For example, for a first phone, so, the neural network outputs 829 can provide a first value that indicates a probability $P(s_0\_1|X)$, which indicates a probability that the window $w_1$ includes the first acoustic state of the $s_0$ phone, given the set of input X, provided at the audio waveform samples 321. For a first phone, $s_1$, neural network outputs 329 can provide a second value indicating a probability $P(s_0\_2|X)$, indicating a probability that the window $w_1$ includes the second acoustic state of the $s_0$ phone, given the set of input, X, provided at the audio waveform samples 321. Similar outputs can be provided for all states of all of the phones $s_0 \ldots s_m$.

The computing system 320 provides different sets of acoustic feature vectors to the neural network 327 to receive predictions or probabilities of the acoustic states in different windows of the utterance. The computing system 320 may provide the neural network outputs 329 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 330 may be derived. The computing system 320 then provides the transcription 330 to the client device 310 over the network 330.

During training, forward propagation through the neural network 327 produces outputs at an output layer of the neural network. As part of training, the outputs may be compared with data indicating correct or desired outputs that indicate that the received frequency feature representation corresponds to a known acoustic state. A measure of error between the actual outputs of the neural network and the correct or desired outputs is determined. The error is then back-propagated through the neural network to update the weights within the neural network 327. The parameters of the filters used by the filter module 325 can also be learned jointly as the neural network 327 is updated. This training process may be repeated for audio waveform samples of multiple different utterances in a set of training data. During training, the frames selected for training can be selected randomly from a large set, so that frames from the same utterance are not processed consecutively.

Figure 4:
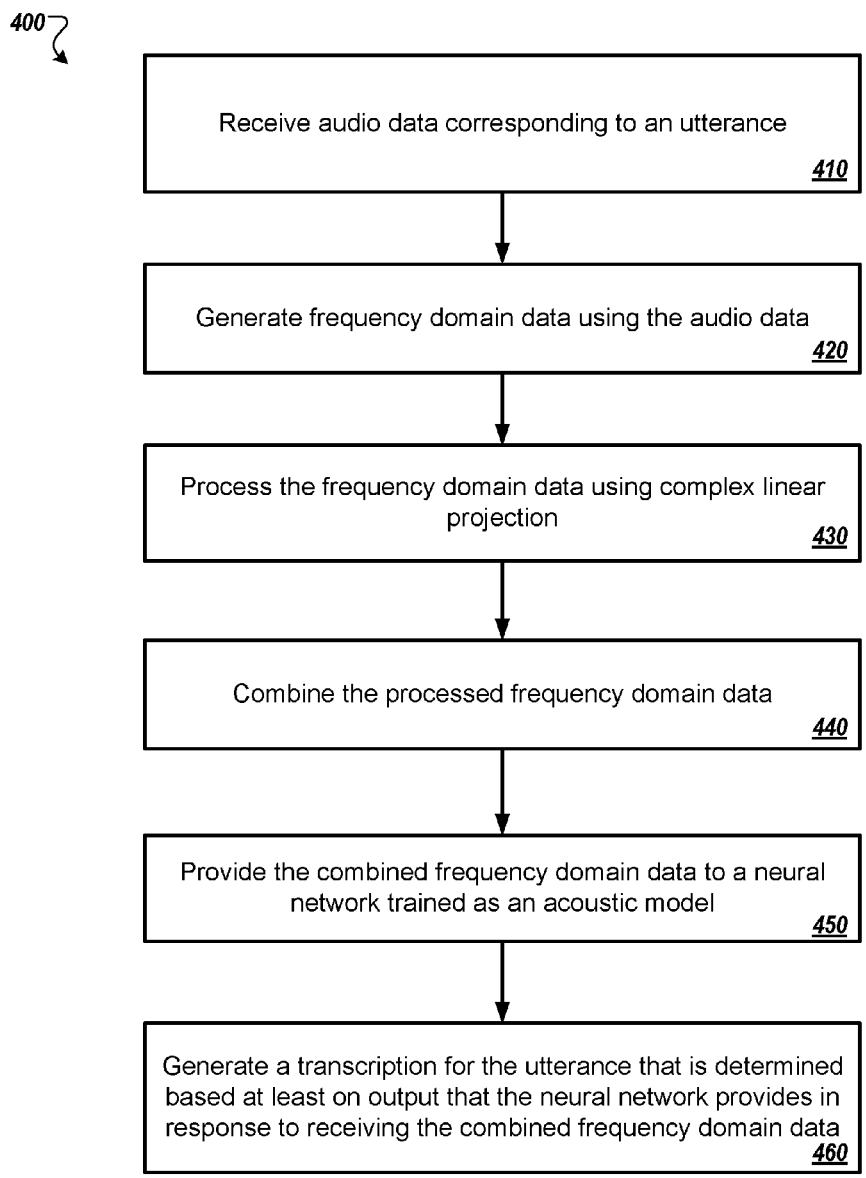
FIG. 4 illustrates an example process for speech recognition using complex linear projection.

FIG. 4 illustrates an example process 400 for neural network adaptive beamforming for multichannel speech recognition. In general, the process 400 receives an utterance and identifies, using a neural network, likely phonemes that correspond to the words of the utterance. The process 400 will be described as being performed by a computer system comprising at one or more computers, for example, system 115 as shown in FIG. 1, system 200 as shown in FIG. 2, or system 300 as shown in FIG. 3.

The system receives audio data corresponding to an utterance (410). For example, the system may detect speech spoken by a user near the system. As another example, the system may detect music playing near the system and use the process 400 for music recognition. Instead of audio data, the system may apply the process 400 to image data for image recognition.

The system generates frequency domain data using the audio data (420). In some implementations, the system processes an input frame of the audio data as it receives the audio data. An input frame may correspond to a few milliseconds of audio data. To generate frequency domain data, the system applies the Fourier transform to the input frame. The result is a vector of frequency domain data that represents the frequency components of the corresponding input frame.

The system processes the frequency domain data using complex linear projection (430). In some implementations, the system generates a convolutional filter using one or more real filter weights and then generates a frequency domain filter using the real filter weights. The resulting frequency domain filter is a matrix where the values of the matrix correspond to the filter weights. The system applies the frequency domain filter to the frequency domain data. To process the frequency domain data using complex linear projection, the system multiples the frequency domain filter by the vector of frequency domain data. In some implementations, the system generates additional filters and applies each filter to the vector of frequency domain data. For subsequent input frame, the system converts the input frame to the frequency domain and applies the frequency domain filters. In some implementations, complex linear projection corresponds to weighted average pooling in time domain. The system performs frequency pooling on the frequency domain data by summing the values to obtain each value in the processed vector. The summing operation may be inherent in the multiplication of the filter matrix and the frequency domain vector.

The system combines the processed frequency domain data (440). In some implementations, the system applies logarithmic compression to the vector of frequency domain data after processing the data using complex linear projection. To apply logarithmic compression, the system calculates the absolute value of each of the complex values in the vector of frequency domain data after processing the data using complex linear projection. The system then computes the logarithm of each absolute value before providing the data to the neural network.

The system provides the combined frequency domain data to a neural network trained as an acoustic model (450). In some implementations, the neural network trained as an acoustic model comprises one or more long-short term memory layers and multiple hidden layers. In some implementations, the neural network is trained using data in the frequency domain. The system generates a transcription for the utterance that is determined based at least on output that the neural network provides in response to receiving the combined frequency domain data (460). In instances where the system processed music, the system may identify the song. In instances where the system processed an image, the system may identify the image.

This application describes the properties of a complex linear projection as an alternative of convolution plus pooling in the real domain. Using the chain of equivalent operations in complex domain, complex linear projection may be equivalent to convolution followed by weighted average pooling. This model was compared with CNN with real value weights and max pooling in the task of joint feature extraction for audio recognition. In some implementations, the CLP model achieves competitive performance on variety of state-of-the-art recognition systems while reducing the total number of computations.

Figure 5:
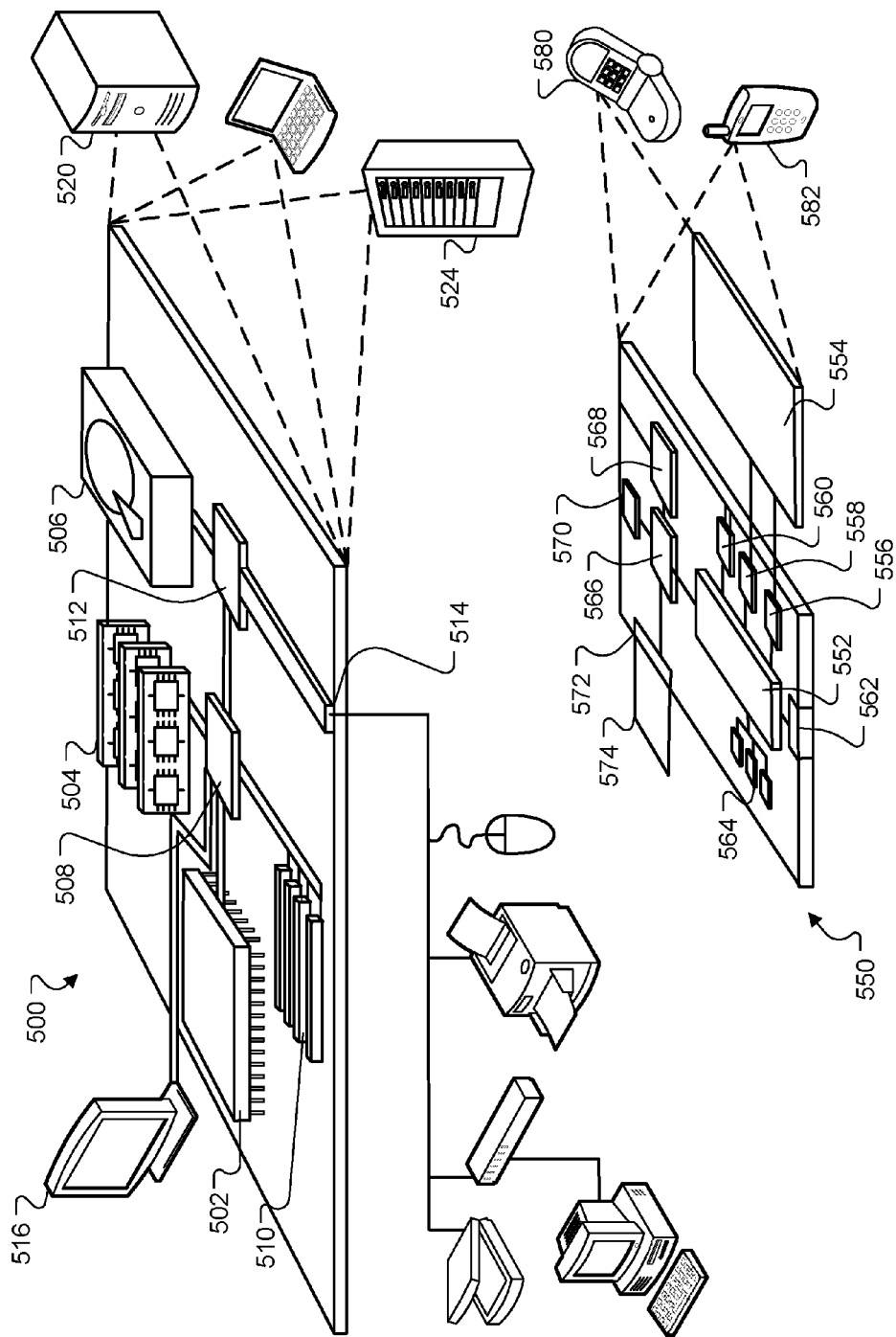
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by one or more computers, audio data corresponding to an utterance;
generating, by the one or more computers, frequency domain data using the audio data;
processing, by the one or more computers, the frequency domain data using complex linear projection;
providing, by the one or more computers, the processed frequency domain data to a neural network trained as an acoustic model; and
generating, by the one or more computers, a transcription for the utterance that is determined based at least on output that the neural network provides in response to receiving the processed frequency domain data.

2. The method of claim 1, wherein processing the frequency domain data using complex linear projection comprises processing the frequency domain data for each input frame of audio data.

3. The method of claim 1, comprising:
generating a convolutional filter with one or more real filter weights; and
generating a frequency domain filter with one or more complex filter weights based on the convolutional filter, wherein processing the frequency domain data using complex linear projection comprises applying the frequency domain filter to the audio data.

4. The method of claim 3, comprising:
receiving an additional input frame of audio data corresponding to the utterance;
generating additional frequency domain data using the additional input frame of audio data;
applying the frequency domain filter with the one or more complex filter weights to the additional frequency domain data; and
providing the filtered additional frequency domain data to the neural network,
wherein generating the transcription for the utterance comprises generating the transcription for the utterance based further on output that the neural network provides in response to receiving the filtered additional frequency domain data.

5. The method of claim 3, wherein convolutional filter or the frequency domain filter are jointly trained using the neural network.

6. The method of claim 1, comprising:
applying logarithmic compression to the processed frequency domain data before providing the processed frequency domain data to the neural network.

7. The method of claim 1, wherein the neural network trained as an acoustic model comprises one or more long-short term memory layers and multiple hidden layers.

8. The method of claim 1, wherein processing the frequency domain data using complex linear projection corresponds to weighted average pooling in time domain.

9. A system comprising:
one or more computers and one or more storage devices storing instructions that are operable, when executed by the one or more computers, to cause the one or more computers to perform operations comprising:
receiving, by one or more computers, audio data corresponding to an utterance;
generating, by the one or more computers, frequency domain data using the audio data;
processing, by the one or more computers, the frequency domain data using complex linear projection;
providing, by the one or more computers, the processed frequency domain data to a neural network trained as an acoustic model; and
generating, by the one or more computers, a transcription for the utterance that is determined based at least on output that the neural network provides in response to receiving the processed frequency domain data.

10. The system of claim 9, wherein processing the frequency domain data using complex linear projection comprises processing the frequency domain data for each input frame of audio data.

11. The system of claim 9, wherein the operations further comprise:
generating a convolutional filter with one or more real filter weights; and
generating a frequency domain filter with one or more complex filter weights based on the convolutional filter, wherein processing the frequency domain data using complex linear projection comprises applying the frequency domain filter to the audio data.

12. The system of claim 11, wherein the operations further comprise:
receiving an additional input frame of audio data corresponding to the utterance;
generating additional frequency domain data using the additional input frame of audio data;
applying the frequency domain filter with the one or more complex filter weights to the additional frequency domain data; and
providing the filtered additional frequency domain data to the neural network,
wherein generating the transcription for the utterance comprises generating the transcription for the utterance based further on output that the neural network provides in response to receiving the filtered additional frequency domain data.

13. The system of claim 11, wherein convolutional filter or the frequency domain filter are jointly trained using the neural network.

14. The system of claim 9, wherein the operations further comprise:
applying logarithmic compression to the processed frequency domain data before providing the processed frequency domain data to the neural network.

15. The system of claim 9, wherein the neural network trained as an acoustic model comprises one or more long-short term memory layers and multiple hidden layers.

16. The system of claim 9, wherein processing the frequency domain data using complex linear projection corresponds to weighted average pooling in time domain.

17. A non-transitory computer-readable medium storing software comprising instructions executable by one or more computers which, upon such execution, cause the one or more computers to perform operations comprising:
receiving, by one or more computers, audio data corresponding to an utterance;
generating, by the one or more computers, frequency domain data using the audio data;
processing, by the one or more computers, the frequency domain data using complex linear projection;
providing, by the one or more computers, the processed frequency domain data to a neural network trained as an acoustic model; and
generating, by the one or more computers, a transcription for the utterance that is determined based at least on output that the neural network provides in response to receiving the processed frequency domain data.

18. The medium of claim 17, wherein processing the frequency domain data using complex linear projection comprises processing the frequency domain data for each input frame of audio data.

19. The medium of claim 17, wherein the operations further comprise:
generating a convolutional filter with one or more real filter weights; and
generating a frequency domain filter with one or more complex filter weights based on the convolutional filter,
wherein processing the frequency domain data using complex linear projection comprises applying the frequency domain filter to the audio data.

20. The medium of claim 19, wherein the operations further comprise:
receiving an additional input frame of audio data corresponding to the utterance;
generating additional frequency domain data using the additional input frame of audio data;
applying the frequency domain filter with the one or more complex filter weights to the additional frequency domain data; and
providing the filtered additional frequency domain data to the neural network,
wherein generating the transcription for the utterance comprises generating the transcription for the utterance based further on output that the neural network provides in response to receiving the filtered additional frequency domain data.

* * * * *